United States Patent
Steininger

(10) Patent No.: US 9,307,852 B2
(45) Date of Patent: Apr. 12, 2016

(54) FLUID DISPENSING VALVE

(71) Applicant: Jeff Steininger, Saint Marys, OH (US)

(72) Inventor: Jeff Steininger, Saint Marys, OH (US)

(73) Assignee: ZAK DESIGNS, INC., Spokane, WA (US)

( * ) Notice: Subject to any disclaimer, the term of this patent is extended or adjusted under 35 U.S.C. 154(b) by 96 days.

(21) Appl. No.: 14/054,550

(22) Filed: Oct. 15, 2013

(65) Prior Publication Data

US 2015/0102046 A1     Apr. 16, 2015

(51) Int. Cl.
*A47G 19/22*     (2006.01)
*F16K 3/34*      (2006.01)

(52) U.S. Cl.
CPC .............. *A47G 19/2272* (2013.01); *F16K 3/34* (2013.01)

(58) Field of Classification Search
CPC ......... A47G 19/2272; F16K 3/34; F16K 3/28; B65D 47/06; B65D 47/20; B65D 2543/00046
See application file for complete search history.

(56) References Cited

U.S. PATENT DOCUMENTS

| 5,890,620 | A | 4/1999 | Belcastro |
|---|---|---|---|
| 6,554,023 | B2 | 4/2003 | Danby et al. |
| 6,732,882 | B2 | 5/2004 | Belcastro |
| 6,883,672 | B2 | 4/2005 | Dunn et al. |
| 7,204,386 | B2 | 4/2007 | Hakim |
| 8,215,519 | B2 | 7/2012 | Steininger |
| 8,333,299 | B2 | 12/2012 | Kemper et al. |
| 8,403,164 | B2 | 3/2013 | Samson |
| 8,418,876 | B2 | 4/2013 | Reay |
| 2003/0089713 | A1 | 5/2003 | Belt et al. |
| 2009/0020544 | A1 | 1/2009 | Yuen |
| 2010/0270322 | A1 | 10/2010 | Lieberman et al. |
| 2011/0079601 | A1* | 4/2011 | Steininger .......... A47G 19/2272 220/714 |

OTHER PUBLICATIONS

PCT Search Report dated Nov. 12, 2014.

* cited by examiner

*Primary Examiner* — Andrew Perreault
(74) *Attorney, Agent, or Firm* — Randall Danskin PS

(57) ABSTRACT

A fluid dispenser and dispensing valve are described, and wherein the dispensing valve includes a valve housing having a wall which defines an internal cavity, and wherein a passageway is formed through the wall of the valve housing; a valve control element is provided and which has a deformable sidewall which is placed within the valve housing in one of a plurality of possible configurations. At least a portion of the sidewall of the valve control element deforms when a vacuum is created in the internal cavity of the valve housing so as to facilitate the controllable delivery of a fluid into the valve housing. The sidewall of the valve control element has a variable thickness dimension.

1 Claim, 10 Drawing Sheets

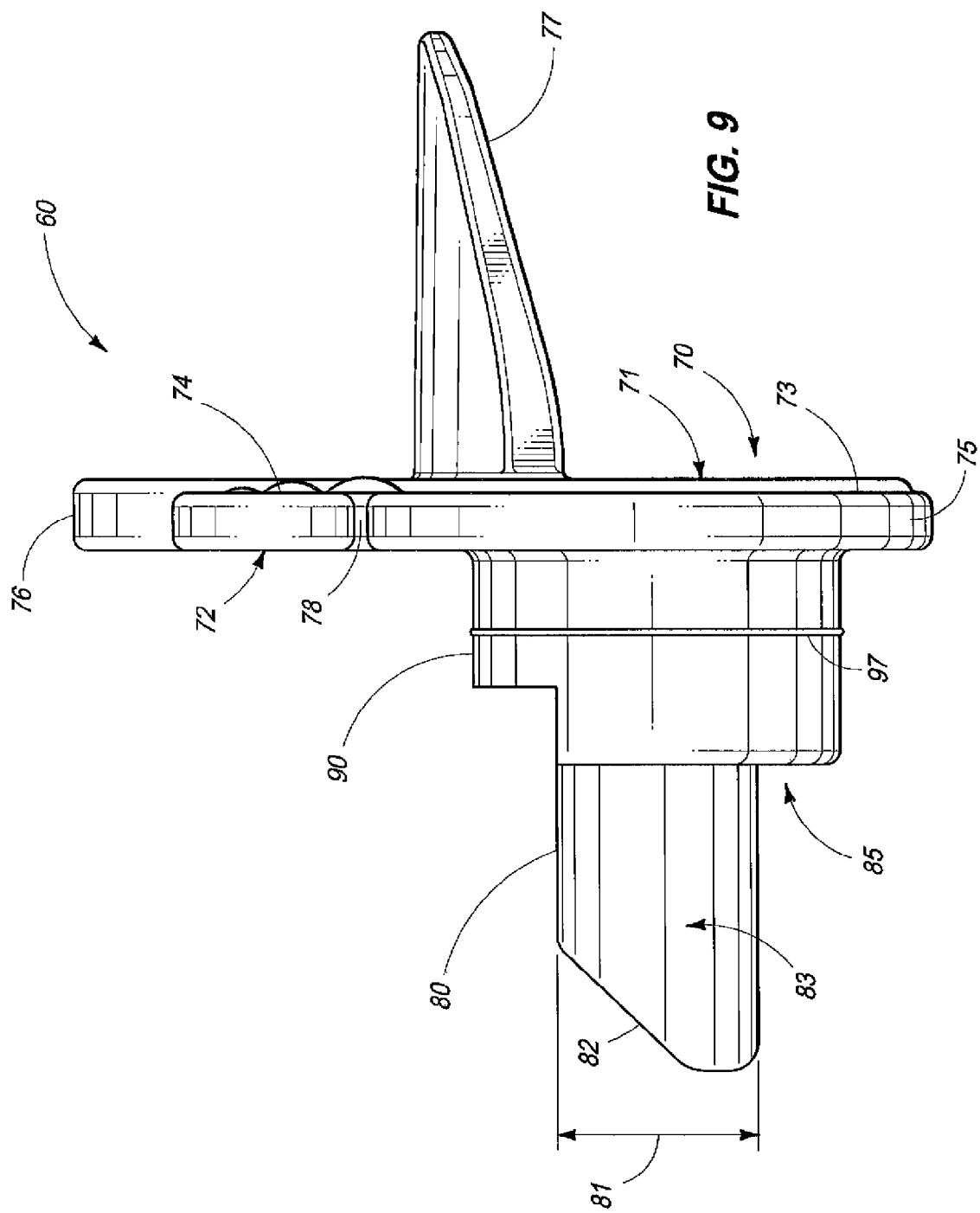

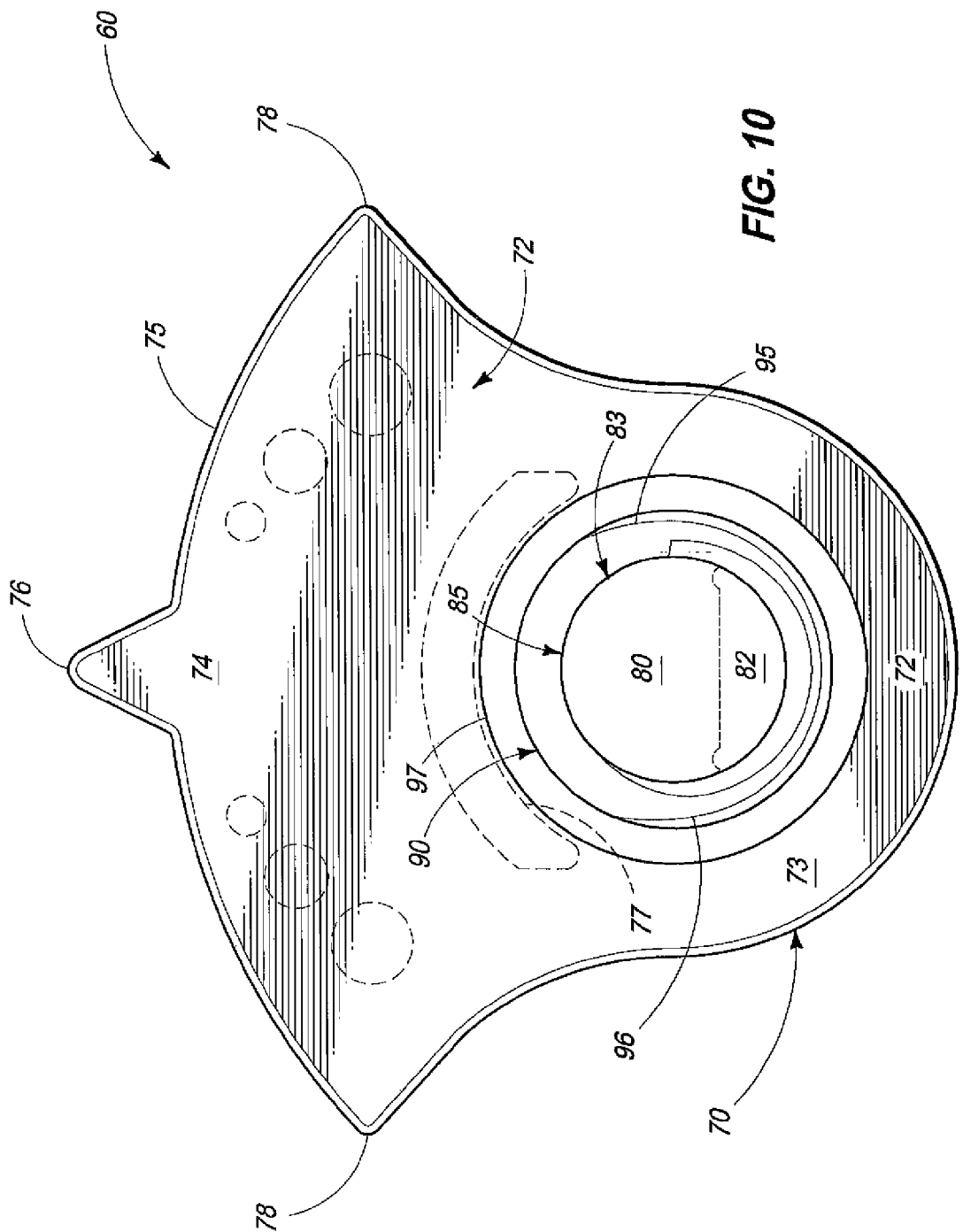

FLUID DISPENSING VALVE

BACKGROUND

1. Field of the Invention

The present invention relates to a fluid dispensing valve for use with a drinking vessel, and more specifically to a fluid dispensing valve which is incorporated into a drinking vessel, and which is further suitable for use by infants, young children and other users.

2. Description of the Related Art

The known art is replete with numerous examples of various valves and other devices which have been used to meter small amounts of fluid to a young child in order to properly teach them how to drink from a cup or other drinking vessel. An example of a valve of the aforementioned type is seen and described in U.S. Pat. No. 8,215,519, the teachings of which are incorporated by reference herein. The known art is also replete with numerous valve arrangements that substantially seal a drinking vessel in the event that the drinking vessel is overturned by a user, but which are operable to permit the flow of fluid into the user's mouth when the user properly applies suction to the drinking vessel.

While the various arrangements found in the known art have worked with varying degrees of success, as a general matter, none of the known arrangements have provided a convenient means whereby a parent or guardian may conveniently and continuously adjust the volumetric flow of the fluid provided by a drinking vessel to an infant or a child as the child progressively masters the technique of drinking on their own, and which further is easy to disassemble and clean after use.

Therefore, a fluid dispensing vessel and associated valve which avoid the determents associated with devices of the known art is the subject matter of the present application.

SUMMARY

A first aspect of the present invention relates to a fluid dispensing valve which includes a valve housing having a wall which defines an internal cavity, and wherein a passageway is formed through the wall of the valve housing, and wherein the valve housing wall has a variable height dimension. A valve control element is provided and which has a resiliently deformable sidewall which is coaxially, rotatably, and moveably received within the internal cavity of the valve housing, and wherein at least a portion of the sidewall of the valve control element deforms when a vacuum is created in the internal cavity of the valve housing so as facilitate the controllable delivery of a source of fluid into the valve housing. The source of fluid is then delivered out an opening to a user's mouth. The present invention includes a post which limits the movement of the resilient deformable sidewall.

Another aspect of the present invention relates to a fluid dispensing valve which includes a fluid container defining a cavity for enclosing a source of fluid to be dispensed, and wherein the fluid container has a top peripheral edge. A detachable cover sealably and matingly cooperates with the top peripheral edge of the fluid container. The fluid container has a first surface facing in the direction of the cavity of the fluid container, and a second, opposite surface which faces outwardly relative thereto. The detachable cover has a first and second opening which individually extend through both the first and second surfaces, and which couples the air pressure as provided by the ambient environment to the cavity of the fluid container, and wherein the second surface further defines a sipping spout, and the first opening is formed in the sipping spout. A valve housing is made integral with the first surface of the detachable cover, and which is defined by a substantially cylindrically shaped wall which extends normally outwardly relative to the first surface of the detachable cover, and which further defines an internal cavity. The internal cavity of the valve housing is substantially aligned with the first opening formed in the detachable cover. The cylindrically shaped wall of the valve housing has a passageway formed therein. A valve control element having a main body defined by a partially deformable sidewall is sized so as to be coaxially and rotatably received and oriented near or adjacent a portion of the valve housing, and wherein the deformable sidewall when disposed, at least in part, in juxtaposed relation relative to the passageway formed in the wall of the valve housing deforms under the influence of a vacuum created in the valve housing by a user's mouth by applying a sucking action to the sipping spout. The deformable sidewall has a predetermined and variable height dimension. In response to the vacuum, a source of fluid contained in the fluid container passes through the passageway formed in the valve housing, and past the deformed sidewall of the valve control element so as to enter the valve housing, and then is subsequently delivered through the sipping spout to the user. The valve control element further includes a post which is disposed in spaced relation relative to deformable sidewall which limits the motion of the deformable sidewall as the sidewall moves under the influence of the vacuum which has been created.

These and other aspects of the present invention will be described in greater detail hereinafter.

BRIEF DESCRIPTION OF THE DRAWINGS

Preferred embodiments of the invention are described below with reference to the following accompanying drawings. Throughout the specification, like numerals generally refer to like parts.

FIG. 1.

FIG. 9 is a side elevation view of the valve control element as shown in FIG. 7.

FIG. 10 is a bottom plan view of the valve control element as shown in FIG. 7.

DETAILED DESCRIPTION OF THE PREFERRED EMBODIMENTS

This disclosure of the present invention is submitted in furtherance of the constitutional purposes of the U.S. Patent Laws "to promote the progress of science and useful arts" (Article 1, Section 8).

Figure 1:
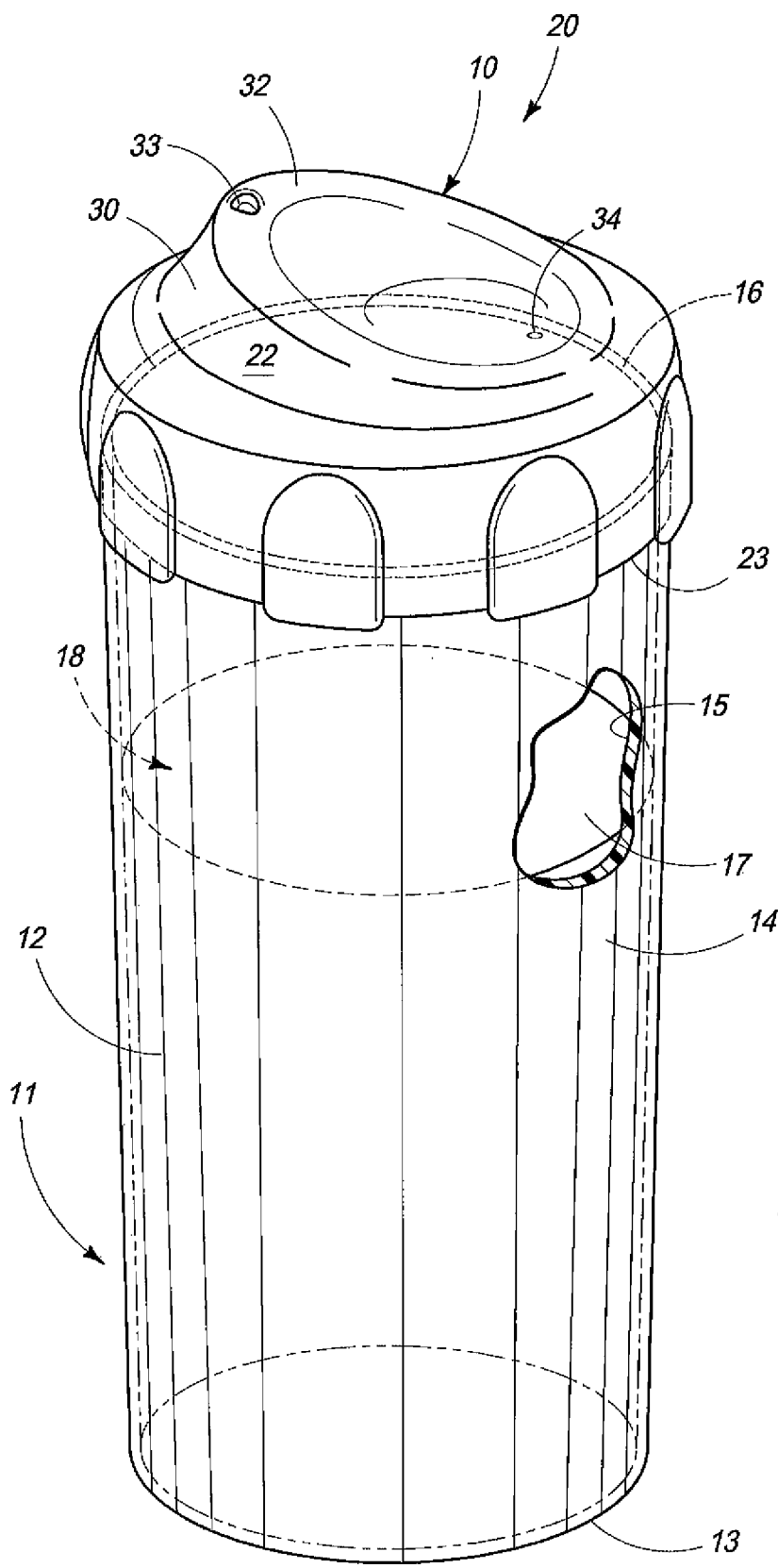
FIG. 1 is a perspective, side elevation view of a drinking vessel which incorporates the fluid dispensing valve of the present invention.
Figure 6:
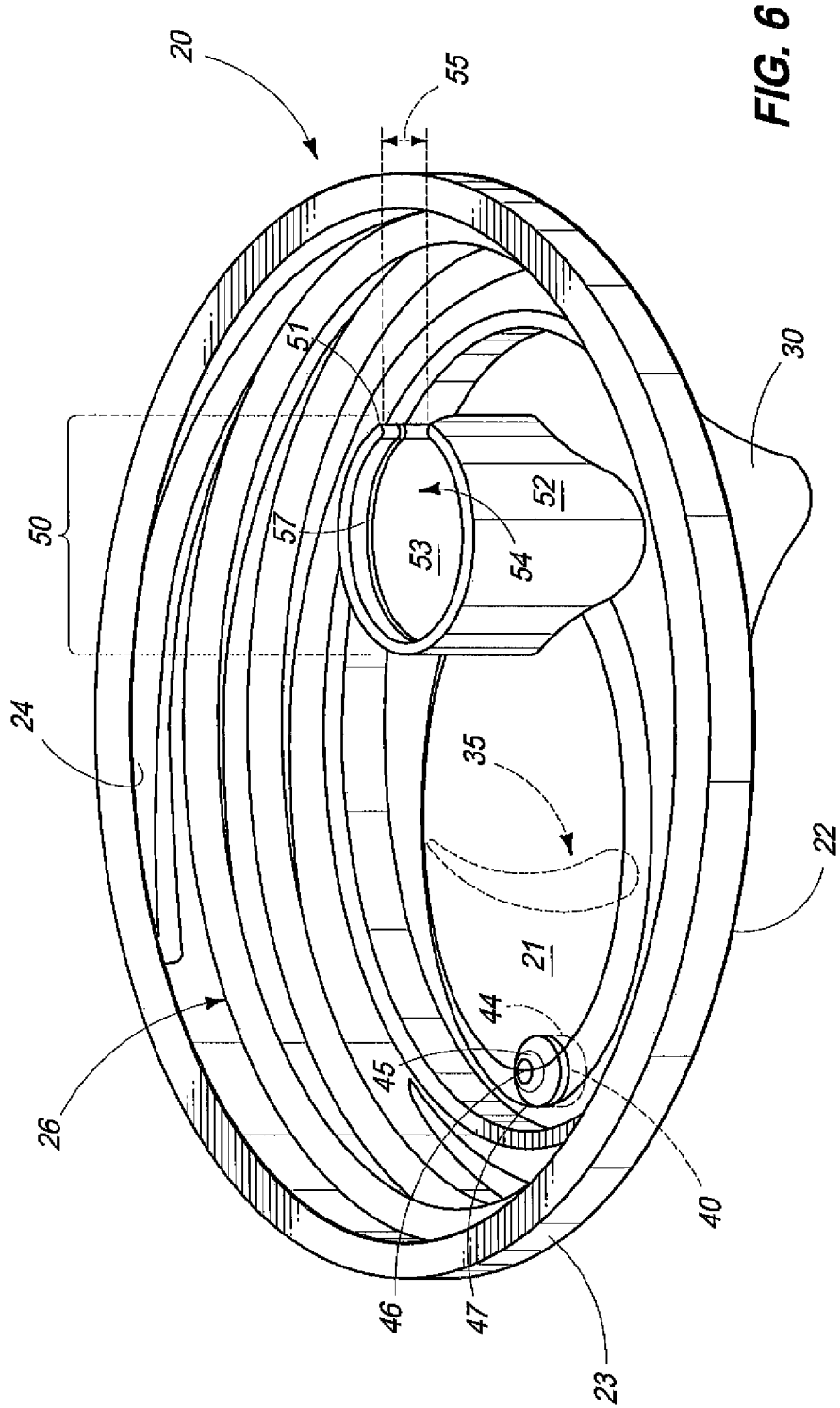
FIG. 6 is a fragmentary, perspective view of a detachable cover mounting the previously mentioned cylindrically shaped valve control element, and which forms a feature of the present invention.

The fluid dispensing valve of the present invention is generally indicated by the numeral 10 in FIG. 1 and following. Beginning with FIG. 1, it will be appreciated that the fluid dispensing valve 10 of the present invention is employed to meter a source of a fluid from a drinking container or vessel and which is generally indicated by the numeral 11. The drinking container or vessel is formed of a continuous, generally vertically oriented and continuous sidewall 12, and further includes a bottom surface 13 which supports the drinking container on an underlying supporting surface (not shown). Further, the continuous sidewall is defined by an outside facing surface 14, and an opposite, inside facing surface which is generally indicated by the numeral 15. Still further, the continuous sidewall 12 defines a top peripheral edge 16, and the inside facing surface 15 defines a container cavity 17 which encloses or stores a fluid to be dispensed which is generally indicated by the numeral 18. Referring more specifically to FIGS. 1 and 6, the present invention 10 and more specifically, the drinking container or vessel 11, releasably matingly couples with a detachable cover which is generally indicated by the numeral 20. The detachable cover 20 has a first surface 21 (FIG. 6), which faces in the direction of the container cavity 17, and an opposite second surface 22 (FIG. 1). Still further, the detachable cover 20 has a circumscribing peripheral edge 23 which has a suitable thread 24 (FIG. 6) formed on the first surface 21 thereof, and which is operable to threadably mate with the top peripheral edge 16 of the drinking container 11. Still further, and as best seen by reference to FIGS. 4 and 6, the first surface 21, at least in part, forms a cover cavity 26, and which partially encloses or receives other structures which will be discussed in greater detail in the paragraphs which follow.

Figure 5:
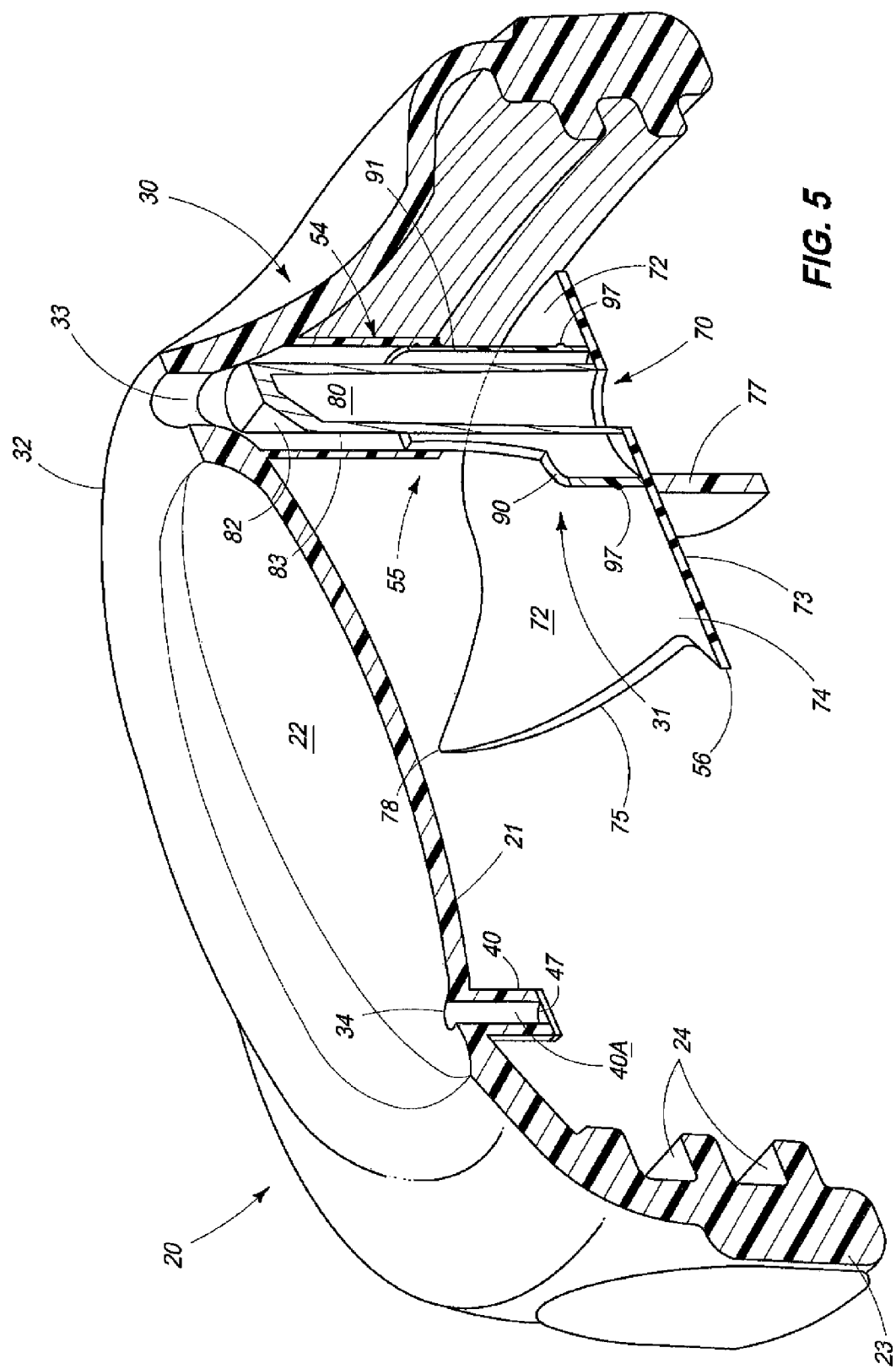
FIG. 5 is a fragmentary, transverse, vertical, sectional view of the previously mentioned fluid dispensing valve of the present invention, and which is taken from a position along line 5-57.

Referring now to FIGS. 1 and 5, it will be seen that a sipping lip or sipping spout 30 extends upwardly relative to the second surface 22, and is shaped so as to be able to be easily received within the mouth of a drinker or user (not shown). The sipping spout 30 has a proximal end 31 (FIG. 5), and an opposite, distal end 32, which is received in the mouth. Still further, as seen in FIGS. 1 and 5, a first opening 33 is formed in the distal end 32, and extends through the first and second surfaces, 21 and 22, so as to couple the ambient environment with the cover cavity 26. Additionally, as seen in the drawings, a second opening 34 is formed in the detachable cover 20, and extends through the first and second surfaces 21 and 22 so as to couple the ambient air pressure with the container cavity 17 so as to facilitate the flow of the liquid to be dispensed 18 out of the drinking vessel 11 when a user drinks from the sipping spout 30.

Figure 4:
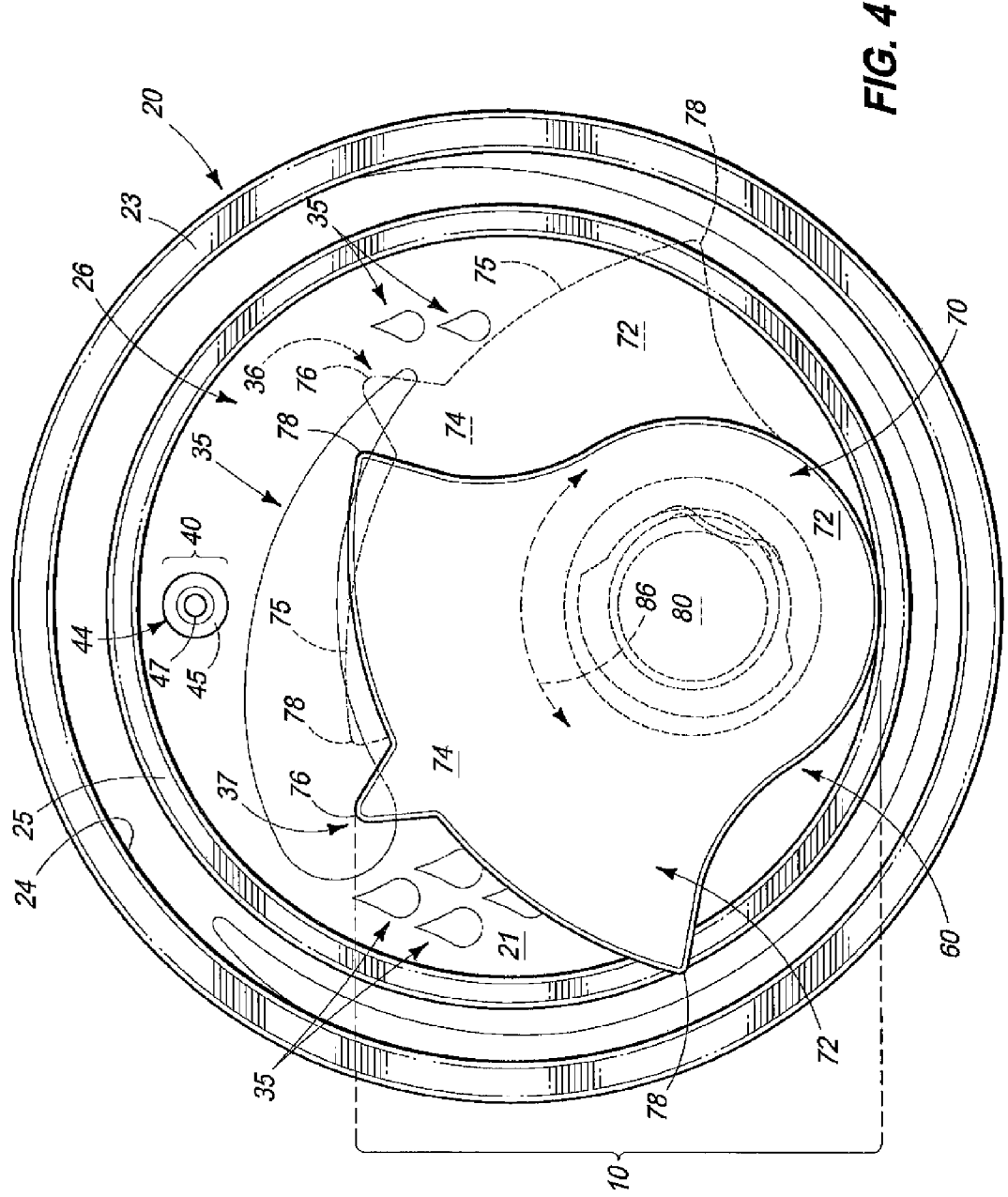
FIG. 4 is a bottom plan view of a valve control element which forms a feature of the present invention, and which is shown installed within a fluid container.

Referring now to FIG. 4, it will be seen that printed or molded indicia 35 is placed on the first surface 21, and is intended to generally and graphically indicate a relative amount of fluid that may be released by the fluid dispensing valve 10 when it is positioned in one of a plurality of various positions along a given arcuately shaped path of travel, or relative to other structures, and features of the dispensing valve 10. In this regard, the printed indicia includes a first valve position 36 (in phantom lines) and which will only allow the fluid dispensing valve 10 to release a small amount of fluid when the user (not shown) provides a sucking action on the sipping spout 30. The printed indicia also includes a second position 37 for the valve 10, and which allows a maximum amount of fluid 18 to be released when the user exerts a sucking action on the sipping spout 30. As should be understood, the valve control element 60 is placed within the cavity 26 which is defined by the detachable cover 20, and is then selectively rotatable relative thereto. In this location and orientation, the valve control element 60 may be set to, or positioned in, a given flow position, for example, and along the path of travel 86 (FIG. 4) prior to screwthreadably securing the cover 20 to the drinking vessel 11. This allows a parent or custodian, for example, to adjust the fluid flow of the vessel 11 prior to the use of the vessel 11 by a child, and prevents any tampering with respect to the fluid flow setting.

The detachable cover 20 also includes a first sidewall 40 (FIG. 5). The first sidewall 40 includes an outwardly facing sidewall surface 44 (FIG. 6) and a top surface 45. The sidewall 40 defines a passageway 40A which extends between the outer surface of the detachable cover 20, and the inside surface 21. A slit valve element 47 is inserted into the passageway and prevents the liquid 18 from exiting the detachable cover 20 when the vessel 11 is not being employed for drinking purposes, but further allows air to enter through the valve element 47 when a vacuum is applied or established inside the vessel or container 11. Slit valves are notoriously well known in the art. Further discussion regarding their structure and function is therefore not warranted.

Referring now to FIG. 4, the detachable cover 20 has a circumscribing peripheral edge 23 which has one or more suitable threads 24 formed on the first surface 21 thereof. The threads 24 are operable to threadably and cooperatively mate the detachable cover 20, with the top peripheral edge 16 of the drinking container 11. The top peripheral edge 16 sealingly mates with a seating surface 25 (FIG. 4) and which is formed in the detachable cover. The first surface 21, at least in part, forms the previously mentioned cover cavity 26.

Still referring to FIG. 6, it will be seen that a valve housing which is generally indicated by the numeral 50, is mounted on the detachable cover 20. More specifically, the valve housing 50 is defined by a generally cylindrically shaped and discontinuous valve housing wall 51 which is mounted on the first surface 21 of the detachable cover 20. The cylindrically shaped valve housing wall 51 has an outside facing surface 52, and an opposite inwardly facing surface 53, which defines an internal cavity 54 having a given internal diametral dimension (not labeled). Still further, as seen in the drawings (FIGS. 4 and 6), a passageway 55 is formed at least partially through or is defined by the cylindrically shaped valve housing wall 51, and which permits the passage of fluid 18 therethrough, in the manner which will be discussed in greater detail, hereinafter. As should be recognized, the cylindrically shaped valve housing wall 51 extends normally outwardly relative to the first surface 21 of the detachable cover 20. The valve housing wall 51 is substantially concentrically outwardly oriented relative to the first opening 33 and which is formed in the detachable cover 20.

Referring again to FIG. 6, the valve housing wall 51 is shown as cylindrical. A passageway 55 or opening in the valve housing wall 51 is shown. However, in one possible form of the invention, a passageway may be optional. Further, the passageway 55, and the valve housing wall 51, may take any one of various forms and shapes as long as the valve housing wall 51 correspondingly conformingly mates against and with a portion of the valve control element 60, and specifically against a portion of the valve sidewall 90. Accordingly, the valve housing wall 51 could possibly take on the form of one or more rigid ribs or wall-shaped projections (not shown). The valve control element 60 as will be discussed may take on the form and shape that is consistent with one or more portions of the valve housing wall 51. As another example, the valve sidewall may take on the shape of the perimeter of a rectangular block that cooperatively matingly abuts a valve housing wall configured as one or more ribs, or the perimeter of a slightly larger rectangular block. The valve housing wall 51 also may be of any shape, combination of shapes or configuration of surfaces such as semi-cylindrical, a combination of two or three sides of a cuboid structure, an arcuate portion of a cylinder, a v-shaped set of walls, a diamond shaped set of walls, etc. For example, the valve housing wall could take on the form of a rigid rib structure formed in the second surface 22 of the detachable cover 20. Alternatively, a valve 10 could take on the form of a valve control element which is releasably fitted between two wall ribs that are formed in the second surface 22 of the detachable cover 20. These and other variations are possible, with the operating principle being that a deformable valve wall 90 deforms and opens a passageway for allowing liquid to pass through the detachable cover 20 when the valve wall is exposed to a vacuum or suction.

Figure 7:
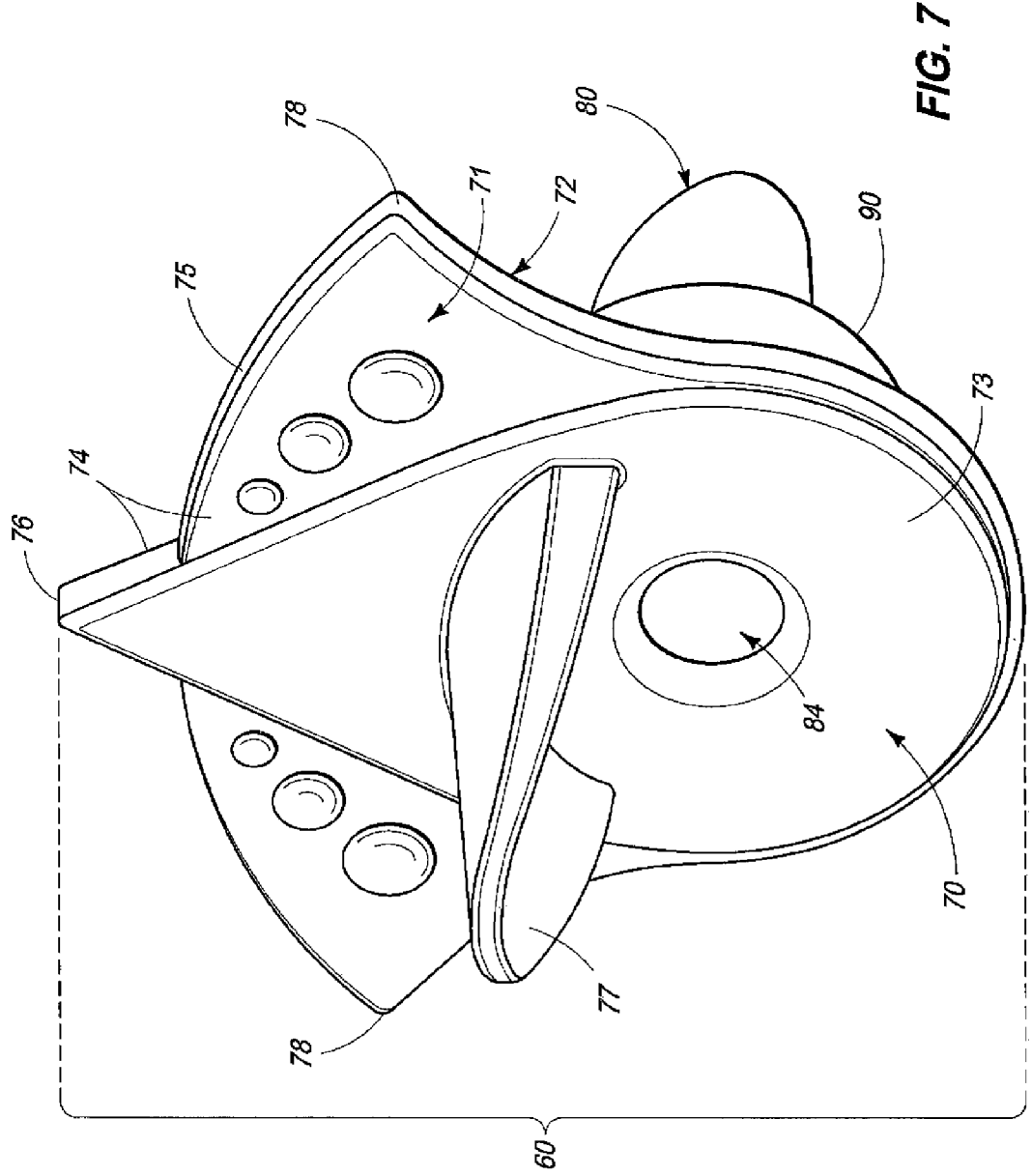
FIG. 7 is a perspective, oblique, side elevation view of the valve control element according to one implementation of the present invention.

As best seen by reference to FIGS. 2-5, the fluid dispensing valve 10 includes a rotatable valve control element which is generally indicated by the numeral 60. In this regard, the valve control element 60 includes a base member which is generally indicated by the numeral 70, and which has a first or top gripping surface 71 which may be engaged by the hand of a user (not shown), and a second or opposite surface 72 (FIG. 9). The base member includes a first portion 73, and a broadened, second portion 74 which has an outside peripheral edge 75 (FIG. 7). A pointer 76 is incorporated into the peripheral edge 75, and provides a convenient visual point of reference for a user so as to determine the approximate (relative) volume of fluid being allowed to be passed through the valve control element 60 to a user who might be sucking on the sipping spout 30 (FIG. 4), as discussed in greater detail herein.

Figure 2:
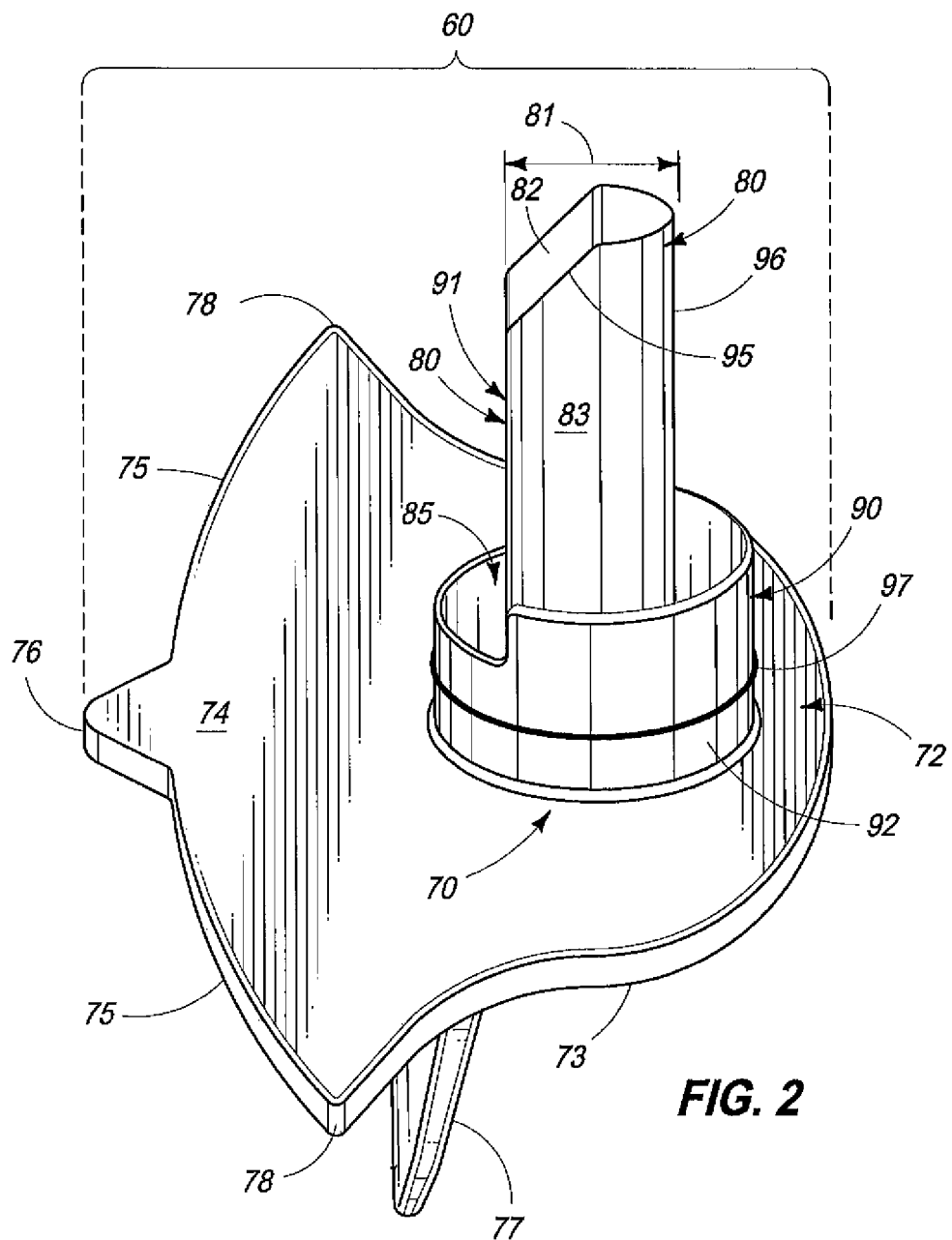
FIG. 2 is a perspective view of a valve control element which forms a feature of the present invention.
Figure 3:
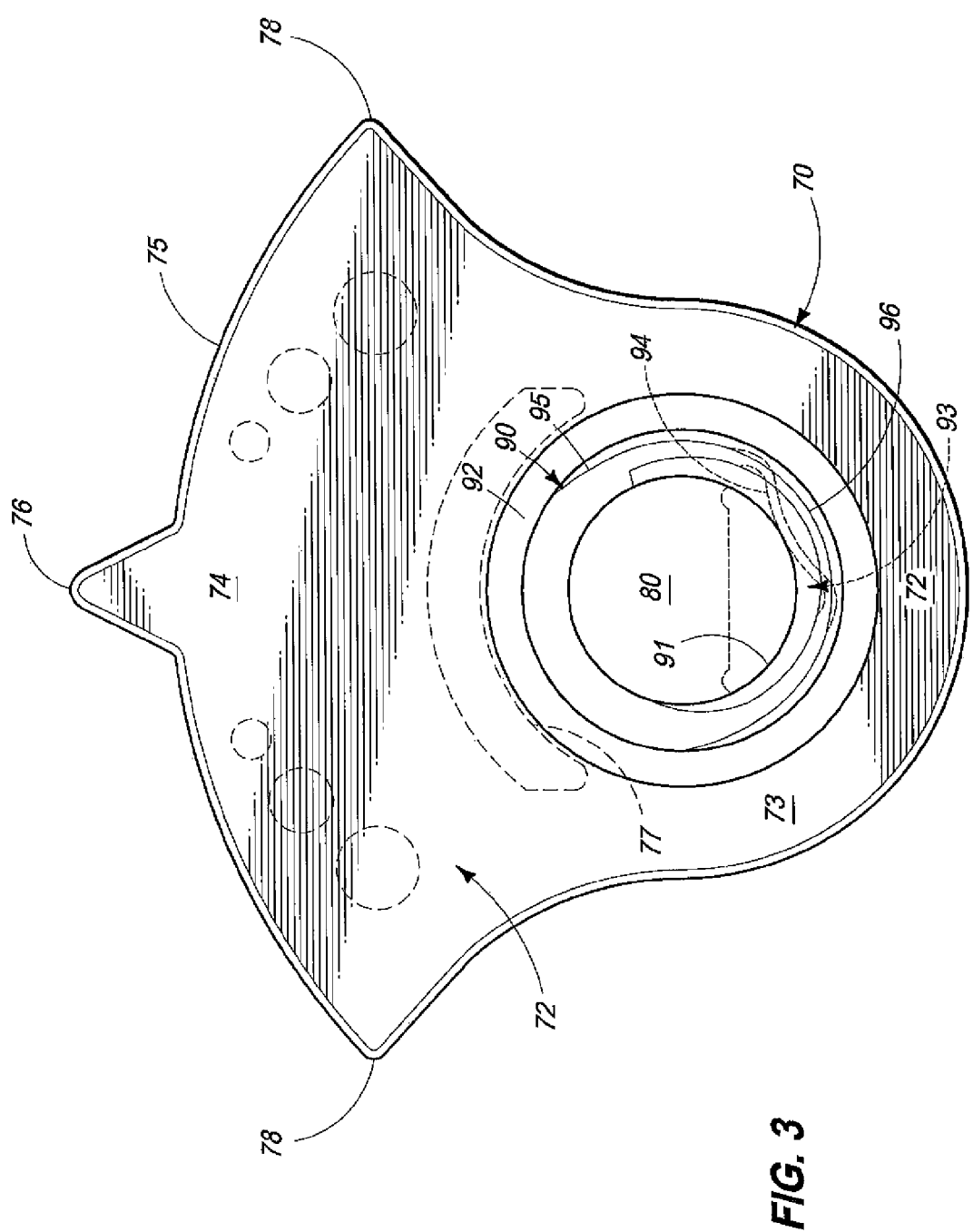
FIG. 3 is a top plan view of a valve control element which forms a feature of the present invention.

Referring to FIGS. 2-4, the valve control element 60, and more specifically the first surface 71, includes and has attached thereto, an arcuate-shaped tab 77 for increased convenience when handling and positioning the valve control element 60. In particular, this tab 77 may be used to either extract the valve control element 60 from the internal cavity 54, for cleaning and the like, or to rotate the valve control element 60. The tab 77 may be of any size, shape and dimension, but is generally ergonomically designed to provide a convenient gripping surface to apply a perpendicular or rotational force to the valve control element 60 relative to the detachable cover 20.

Further, the valve control element 60, and more specifically the second surface thereof 72 has attached thereto, and extending outwardly therefrom a generally cylindrically shaped post 80. The post 80 has a given length or height dimension which is typically equal to or greater than a maximum height dimension of a resilient and deformable valve wall and which will be disclosed below. The post 80 is operable to be telescopingly received within the internal cavity 54. The internal cavity 54 and the inwardly facing surface 53 define, at least in part, a course of rotational movement for the valve control element 60, generally. In this regard, the cylindrically shaped post 80 is matingly fitted into the internal cavity 54. The cylindrically shaped post 80 extends substantially normally upwardly or outwardly relative to the surface 72 of the base member 70 (FIG. 2). The cylindrically shaped post 80 has an angularly shaped distal end 82, and an outwardly facing surface 83 (FIG. 9). As best understood by a study of FIGS. 2 and 5, the shape of the distal end 82 matingly conforms, at least in part, with the shape or geometry of the internal cavity 54 and sipping spout 30. The relative size and shape of the post 80 is insufficient to prevent the flow of liquid into the internal cavity 54. Accordingly, the shapes of the post 80 and internal cavity 54 can be varied to matingly cooperate with each other while not interfering with the adjustment of the valve control element 60 which is disposed in the valve housing 50.

Referring now to FIG. 2, and extending substantially normally upwardly, or outwardly relative to the second surface 72 of the base member 70, and located generally within the first portion 73, thereof, is a cylindrically shaped and resilient valve sidewall which is generally indicated by the numeral 90, and which is operable to be rotatably received within the internal cavity 54 of the valve housing 50 (FIG. 6). In this regard, the cylindrically shaped and resilient valve sidewall 90 is defined by a first inside facing surface 91, and a second outside facing surface 92. The resilient valve sidewall has a non-uniform height dimension as seen in the drawings. The post 80 typically has a length dimension greater than the maximum height of the resilient valve sidewall 90. The outside facing surface 92 of the sidewall 90 is operable to be disposed in juxtaposed sliding and sealable engagement thereagainst the inside facing surface 53 of the cylindrically shaped valve housing wall 51 (FIG. 5). Still further, it will be seen that the second outside facing surface 92 has an outside diametral dimension (not labeled) and which is less than the inside diametral dimension of the internal cavity 54 of the valve housing 50. Still further, the second, outside facing surface 92, defines a passage 93 (FIG. 3) when the resilient sidewall 90 deforms to a second position 94 upon being exposed to suction. During such condition, the cylindrically shaped valve sidewall 90 includes a resiliently deformable portion 94 which includes a given region which has a variable thickness dimension as it is measured at various points along the circumferential direction. The relevant and operational thickness is measured at a place on the sidewall 90 that is oriented in juxtaposed relation relative to the passageway 55 during use of the fluid dispensing valve 10. The resilient deformable portion of the wall is movably restrained by the post 80.

As seen and best understood by reference to FIG. 5, the valve control element 60 is telescopingly received in the nature of a friction-fit within the cylindrically shaped valve housing wall 51, and is selectively rotatable relative to the cylindrically shaped valve housing wall 51 so as to locate or orient the deformable portion of the wall 94 in a predetermined aligned relationship relative to the passageway 55, and which is formed through the cylindrically shaped valve housing wall 51. As should be understood, and when a suction is applied by the mouth of a user to the sipping spout 30, the created suction causes the deformable portion 94 of the cylindrically shaped sidewall 90 of the valve control element 60 to resiliently deform (FIG. 3) and move out of juxtaposed and occluding engagement relative to the generally cylindrically shaped valve housing wall 51. This deformation allows the fluid 18 which is contained within the drinking vessel 11 to be dispensed, or pass through the passageway 55 which is formed in the valve housing 50, and move into, or to, the first opening 33 where it is delivered to the user. According to one implementation of the invention, the diametral dimension 81 of the post 80 is selected so as to give support to the deformable portion 94 when exposed to the suction so as to encourage the resilient, deformable portion 94 to resume its non-deformed shape, and position, after the suction ceases. Further, it should be understood that the post 80 provides a certain degree of rigidity for the operation of the valve control element 60 such as when the valve control element 60 is fabricated from a pliable material. Still further, the user, upon ceasing the suction action on the drinking spout 30, permits the deformable portion 94 of the cylindrically shaped valve housing wall 51 to return to its original condition and resume a sealing, substantially occluding orientation relative to the passageway 55, and which is formed in the valve housing wall 51. As should be understood, the selective rotatable positioning of the deformable portion of the valve control element sidewall 94 relative to the passageway 55 formed in the valve housing wall 50 causes a selective, and variable amount of fluid 18 to be released to the sipping spout 30 for a given same time over which a fixed amount of suction is applied, as earlier described. For example, if a user desires to maximize the flow of fluid 18 from the vessel 11, the deformable portion 94, and more specifically, the thinnest region thereof, would be aligned with the opening 55. As will be appreciated, orienting the thickest portion 95 of the deformable portion in alignment with the opening 55 will result in the least amount of deformation, and thus the smallest amount of fluid 18 being released from the vessel 11. On the other hand, the thinnest region 96 would deform to the greatest extent thereby allowing the greatest amount of fluid to pass therethrough. As seen in FIG. 4, the valve control element 60 is located within the cavity 26 as defined by the detachable cover 20. In this location, the valve control element 60 may be set in a given flow position by a user, for example, along the path of travel 86, and then the cover 20 is screwthreadably secured to the drinking vessel 11, so as to prevent a child or infant from gaining access to the valve control element and accidentally changing the flow position.

Referring again to FIG. 6, the cylindrically shaped valve sidewall 90, and more specifically the semi-cylindrically shaped second outside facing surface 52, and the inwardly facing surface 53 of the housing 50 define, at least in part, a course of rotational movement 86 for the valve control element 60, generally. In this regard, the valve sidewall 90 and post 80 are fitted into the internal cavity 54. The cylindrically shaped post 80 extends substantially normally upwardly relative to the surface 72 of the base member 70 (FIG. 2). The cylindrically shaped post 80 has a shaped distal end 82 and an outwardly facing surface 83. As best understood by a study of FIGS. 2 and 5, the shape of the distal end 81 conforms substantially with the shape or geometry of the internal cavity 54 and sipping spout 30, and the size and shape of the post 80 is insufficient to prevent the flow of liquid into the internal cavity 54, but is, however, spaced from the wall of the valve, and in particular, the deformable portion of the wall 94. Accordingly, the shapes of the post 80 and internal cavity 54 can be varied to substantially cooperate together without interfering with the adjustment of the valve control element 60, and which is disposed in a telescoping relationship within the valve housing 50.

When appropriately mated with the valve housing 50, the valve control element 60, and more specifically the valve sidewall 90, prevents liquid 18 from escaping through the valve housing 50. The valve sidewall 90 is operable to be disposed in juxtaposed sliding and fluid sealable relation against the inwardly facing surface 53 of the valve housing 50 when the valve control element 60 is properly installed.

Referring to FIGS. 2 and 6, the valve sidewall 90 includes a circumscribing ridge or flange 97 which is formed at least along a portion of the circumference of the valve sidewall 90. The valve housing 50 also includes a groove 57 for matingly receiving the ridge 97. The ridge 97, and groove 57 provide a means for defining the course of travel 86 for the valve control element 60. Further, the ridge 97 and groove 57 cooperate in the nature of a snap-fit to releasably secure the valve control element 60 in the valve housing 50 and detachable cover 20. Still further, the ridge 97 and groove 57 cooperate to increase the frictional engagement of the valve control element 60, and valve housing 50, so as to encourage the valve control element 60 to remain in a stationary location during use, and corresponding to a desired liquid flow rate for a given amount of suction. Still further, for a valve control element 60 which is fabricated of a pliable material, the valve control element 60 is easily inserted and removed from the valve housing 50 even with the added retention which is attributed to the mechanical cooperation and friction-inducing interaction of the ridge 97 and groove 57. The frictional engagement is not so great between the contacting surfaces so as to prevent the selective rotation of the valve control element 60 along the course of travel 86. As will be appreciated by a study of FIG. 4, when the valve control element 60 is in the first valve position 36, the valve control element 60 will be adjusted so as to provide a minimal amount of fluid from the drinking vessel to a user of the vessel. On the other hand, when the valve control element 60 is in the second valve position 37 (by moving the valve control element counter-clockwise from the first valve position 36), a maximum amount of fluid is released by the valve control element 60. Due to the cylindrical shape of the valve sidewall 90, rotation of the valve control element 60 is limited in its rotational position by the abutment of one of the tips 78 of the broadened, second portion 74 against the peripheral edge 23 of the detachable cover 20. Generally, in operation, a user selects a position within the operational movement and range of the valve control element 60.

Referring to FIG. 7, the valve control element 60 includes a base member 70. The base member has a first gripping surface 71 which may be engaged by the hand of a user, and a second, opposite surface 72. As shown in FIG. 7, a tab 77 projects from the first gripping surface 71. The tab 77 is arcuate in shape to facilitate rotation of the valve control element 60, and to facilitate gripping between a finger and thumb of a user (not shown). The tab 77 also facilitates at least in part, the effective extraction or detachment of the valve control element 60 from the internal cavity 54 of the detachable cover 20 for cleaning of these parts. The base member 70 also includes a first portion 73, and a broadened, second portion 74 which has an outside peripheral edge 75, and end points 78. A pointer 76 is incorporated into the peripheral edge 75. As earlier noted, the pointer 76 provides a convenient visual point of reference for a user relative to the detachable cover 20. The position of the pointer 76 indicates an approximate (relative to other positions) volume flow rate of fluid which is allowed to pass through the valve control element 60, and detachable cover 20, to a user applying suction to the sipping spout 30 (FIG. 1). A generally cylindrically shaped post 80 extends generally perpendicularly or outwardly from the second surface 72 of the valve control element 60. The valve control element 60 includes a resilient valve sidewall 90 that is operable to be rotatably received within the internal cavity 54 of the detachable cover 20, and specifically, fluid sealingly mates with the inwardly facing surface 53 of the valve housing 50. The post 80 restricts the range of motion or travel of the resilient valve sidewall.

Figure 8:
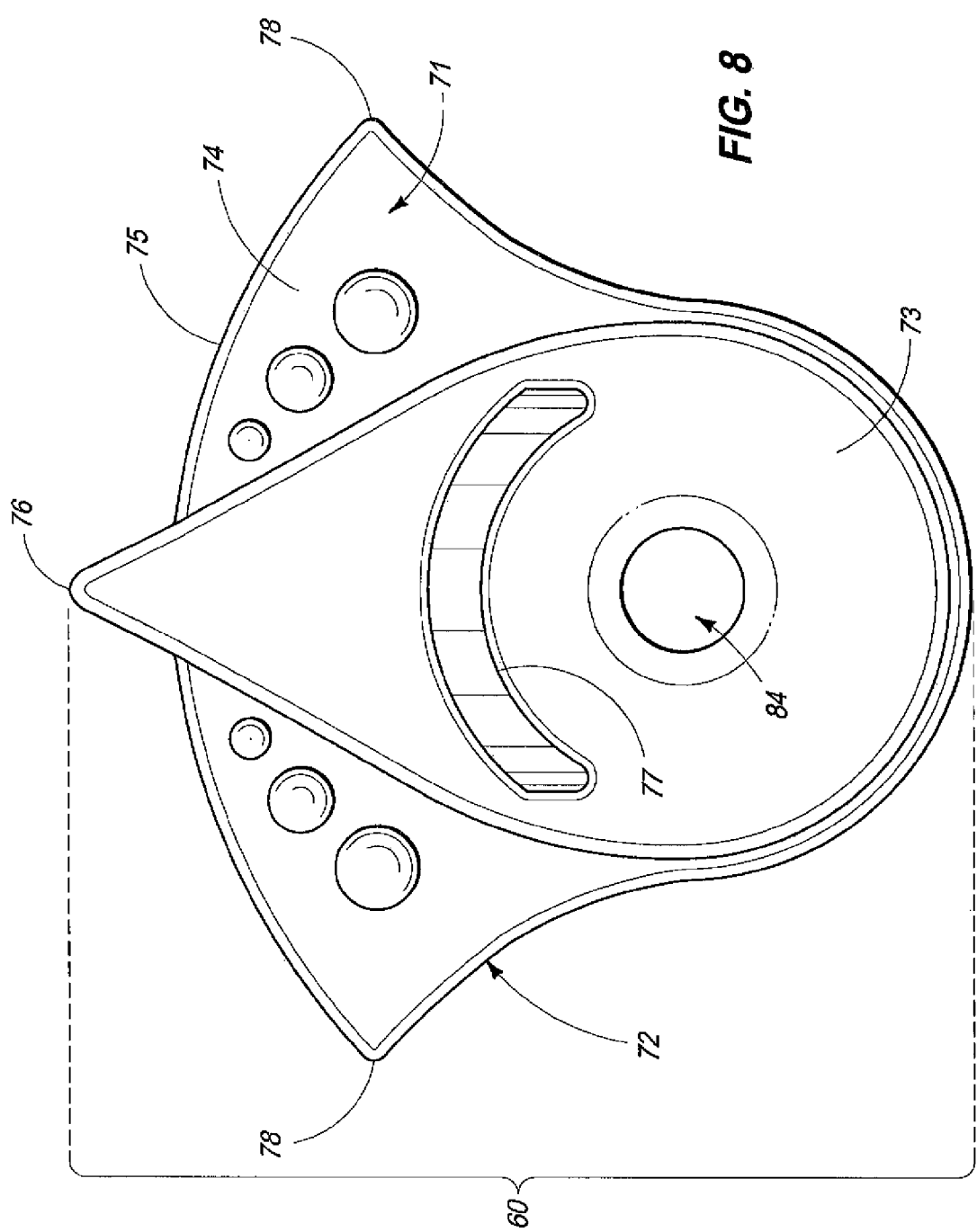
FIG. 8 is a top plan view of the valve control element as shown in FIG. 7.

Referring now to FIG. 8, the valve control element 60 as depicted includes a base member 70, a first gripping surface 71, a second, opposite surface 72, and an arcuately shaped tab 77. The base member 70 includes a first portion 73, and a broadened, second portion 74 which has an outside peripheral edge 75, a pointer 76, and end points 78. The base member 70 is shaped to form a hollow cylindrically shaped space 84 which generally corresponds to the interior of the post 80 (shown in FIG. 7).

Referring now to FIG. 9, the valve control element 60 as depicted includes a base member 70. The base member 70 has a first gripping surface 71 that may be engaged by the hand of a user, and a second, opposite surface 72. The base member 70 includes a first portion 73, and a broadened, second portion 74. The broadened, second portion 74 includes an outside peripheral edge 75, a pointer 76, and end points 78. A tab 77 projects from the first surface 71. A generally cylindrically shaped post 80 extends generally perpendicularly or outwardly from the second surface 72. As shown, the cylindrically shaped post 80 has a generally uniform diametral outer dimension 81. However, the post 80 may take any shape, size or dimension consistent with the principles and description as provided herein. In FIG. 9, the post 80 has an angularly shaped distal end 82 and an outwardly facing surface 83. The valve control element 60 includes a valve sidewall 90. A space 85 is formed between the post 80, and the valve sidewall 90. The valve sidewall 90 is operable to be rotatably received within the internal cavity 54 of the detachable cover 20, and more specifically, sealingly mates with the inwardly facing surface 53 of the valve housing 50. The valve sidewall 90 includes a ridge 97 for matingly engaging in a groove 57 of the valve housing 50.

Referring now to FIG. 10, the valve control element 60 as depicted includes a base member 70. The base member 70 includes a second surface 72, a first portion 73, and a broadened, second portion 74. The broadened, second portion 74 includes an outside peripheral edge 75, a pointer 76, and end points 78. A generally cylindrically shaped post 80 extends generally perpendicularly or outwardly from the surface 72. The post 80 has a shaped distal end 82 and an outwardly facing surface 83. The valve control element 60 includes a valve sidewall 90. A space 85 is formed between the post 80 and the valve sidewall 90 to allow a portion of the valve sidewall 90 to deform in the presence of a vacuum. The valve sidewall 90 is operable to be removably and rotatably received within the internal cavity 54 of the detachable cover 20, and specifically, mates sealingly with the inwardly facing surface 53 of the valve housing 50. The resilient valve sidewall 90 includes a ridge 97 for matingly engaging in a groove 57 of the valve housing 50.

Operation

The operation of the described embodiment of the present invention 10 is believed to be readily apparent and is briefly summarized at this point.

Referring now to the drawings, a fluid dispensing valve 10 includes, in its broadest aspect, a valve housing 50 having a wall 51 which defines an internal cavity 54, and wherein a passageway 55 is formed through the wall of the valve housing 50. Still further, in its broadest form of the invention the fluid dispensing valve 10 includes a valve control element 60 having an at least partially and resiliently deformable sidewall 90 which is received by, or placed adjacent to, a passage or internal cavity 54 of the valve housing 50, and wherein at least a resiliently deformable portion 94 of the sidewall 90 of the valve control element 60 deforms to a second position (FIG. 3) when a vacuum is created in the internal cavity 55 of the valve housing 50, so as facilitate the controllable delivery of a source of fluid 18 into the valve housing 50. In the arrangement as seen in the drawings, the fluid dispensing valve 10 is incorporated within a fluid container 11, and which defines a cavity 17 for enclosing the source of fluid 18. The fluid dispensing vessel 11 includes a detachable cover 20 which is borne by the fluid container 11, and wherein the valve housing 50, and valve control element 60, are mounted on the detachable cover 20.

In the arrangement as seen in the drawings, the detachable cover 20 has a first opening 33 formed therein and which couples the internal cavity 54 of the valve housing 50 with the ambient environment. Still further, during operation, a vacuum is created by a user's mouth via a sucking action within both the cavity 17 of the fluid container and the internal cavity 54. A second opening 34 is provided, and is formed in the detachable cover 20, and which further couples the ambient environment with the cavity 17 defined by the fluid container 11. In the arrangement as seen in the drawings, the deformable sidewall 90 of the valve control element 60 has a readily and resiliently deformable portion 94 which has a variable thickness dimension. More specifically, the deformable sidewall 90 of the valve control element 60 deforms under the influence of the vacuum which is created in the internal cavity 54 of the valve housing 50 as a user sucks on the sipping spout 30. When the deformable portion 94 of the sidewall 90 of the valve control element 60, which has the variable thickness dimension, is at least partially aligned and in juxtaposed (at least partial covering and occluding) relation relative to the passageway 55 formed through the valve housing wall 51, the deformable portion 94 deforms in the presence of suction or vacuum. When the thinnest region of the deformable portion 94 is aligned with the passageway 55, the greatest amount of deformation results. This causes the greatest amount of fluid 18 to pass through the valve 10 per time unit. On the other hand, when the thickest region 94 is aligned with the opening 55, the least amount of deformation occurs. This causes the least amount of fluid 18 to pass through the valve 10 under like conditions. The post 80 which is provided limits or restricts the motion of the deformable wall and further assists in returning the wall to an occluding position relative to the valve housing 50.

In addition to the foregoing, the present invention includes a valve control element 60 which includes a base member 70 having opposite first and second surfaces 71 and 72. In this regard, the deformable sidewall 90 of valve control element 60 is substantially cylindrically shaped and extends substantially normally upwardly relative to the second surface 72 of the base member 70. When a user applies a rotational force to the valve control element 60, such as through the tab 77, the force causes the deformable sidewall 90 of the valve control element 60 to be selectively rotated relative to the valve housing 50. Such rotation orients a portion of the deformable sidewall 90 to a selected position or orientation relative to the passageway 55, and which is formed through the valve housing wall 51. In the arrangement as seen in the drawings, the selective positioning of the deformable sidewall 90 of the valve control element 60 relative to the passageway 55 causes a certain fluid flow or amount of fluid 18 to pass into the valve housing 50 when the vacuum is created in the internal cavity 54 of the valve housing 50 by a user's sucking action.

This selectable fluid flow is caused by varying the ease of deformation or amount of deformation of the resiliently deformable portion 94 of the wall 90 because of its variable thickness dimension. As shown in the drawings, the internal cavity 54 of the valve housing 50 is substantially cylindrically shaped, and has a predetermined inside diametral dimension, and the valve control element 60 is cylindrically shaped, and has an outside diametral dimension which is less than the inside diametral dimension of the internal cavity 54 of valve housing 50. The valve control element 60 is received in a rotatable, coaxially aligned, friction-fitted orientation within the cylindrically shaped internal cavity 54 of the valve housing 50. A ridge 97 is formed along some or all of the circumference of the valve sidewall 90. The valve housing 50 includes a groove 57 for receiving the ridge 97. The juxtaposition and alignment of the ridge 97 in the groove 57 encourages and facilitates the maintenance of the valve control element 60 in a working rotatable position in the valve housing 50.

In the arrangement as seen in the drawings, the valve control element 60 is substantially cylindrically shaped, and the deformable sidewall portion 94 has a thickness dimension which varies between about 0.5 mm to about 1.5 mm when measured in the radial direction of the cylindrical sidewall 90. Other ranges of thicknesses are possible. The selected ranges depend upon the material and characteristics of the valve control element 60, and the material and characteristics of the valve housing 50. Still further, according to a first implementation of the invention, the deformable portion 94 of the sidewall 90 forming the valve control element 60 represents less than about 50% of the deformable sidewall 90. In operation, it is possible for a portion substantially smaller than the 50% of the deformable sidewall to actually deform in the presence of the vacuum.

Therefore, it will be seen that the present fluid dispensing valve 10 provides a convenient means whereby a parent or guardian can conveniently and safely adjust a flow rate for fluid 18 to be dispensed from a drinking vessel or container 11 in a manner not possible heretofore. Further, the present invention may be readily disassembled and cleaned and disinfected by merely pulling the valve control element 60 out of engagement with the valve housing 50.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fluid dispensing valve for dispensing fluid from a container having an internal cavity containing fluid, the fluid dispensing valve comprising:
    a detachable cover for releasably interconnecting with the container, the detachable cover having a first surface which faces in the direction of the container internal cavity, and an opposite, second surface, the detachable cover further having a downwardly depending peripheral edge which matingly cooperates with the container;
    a first passageway defined in the detachable cover that communicates between the first surface and the second surface for fluid to flow therethrough, and a second passageway defined in the detachable cover spaced apart from the first passageway, that communicates between the first surface and the second surface to couple an air pressure of a surrounding ambient environment with the container internal cavity to facilitate the flow of the fluid through the first passageway;
    a sidewall circumscribing the second passageway, and wherein the circumscribing sidewall depends downwardly from the first surface of the detachable cover;
    a slit valve mounted within the downwardly depending circumscribing sidewall which selectively occludes the second passageway, and substantially impedes the passage of fluid through the second passageway, but allows the air pressure of the ambient environment to be equalized through the slit valve to allow a smooth flow of fluid from the internal cavity of the container through the first passageway;
    a valve housing carried on the first surface of the detachable cover concentrically oriented relative to the first passageway, and wherein the valve housing is defined, in part, by a discontinuous valve housing wall that defines a passageway therethough, and by an internal cavity;
    a valve control element rotatably cooperating with the valve housing to selectively dispense fluid from the internal cavity of the container, and wherein the valve control element is defined, at least in part, by a base member having an outwardly facing portion having a peripheral edge, and wherein a force applied to the outwardly facing portion permits the valve control element to be selectively rotated relative to the valve housing, and wherein the peripheral edge of the outwardly facing portion, when rotated, comes into direct frictional contact with the downwardly depending peripheral edge of the detachable cover so as to limit the rotatable movement of the valve control element to a predetermined path of travel relative to the valve housing, and wherein the valve control element further includes a partially deformable sidewall which is mounted on the base member, and the partially deformable sidewall is sized to be telescopingly received within the internal cavity defined by the valve housing, and wherein the deformable sidewall, when disposed in a juxtaposed relationship relative to the valve housing passageway defined in the discontinuous valve housing wall deforms when a vacuum is created within the valve housing, and the partially deformable sidewall has a variable thickness dimension that corresponds to a predetermined flow rate of fluid which passes through the fluid dispensing valve for delivery to the first passageway when the valve housing is exposed to the vacuum which is created by a user applying a sucking action to the first passageway, and the valve control element further includes a post which is located in spaced relation relative to the partially deformable sidewall which further limits movement of the partially deformable sidewall, and wherein the selective rotation of the valve control element along the predetermined path of travel defines a continuous range of predetermined flow rates of fluid from the internal cavity of the container, and through the first passageway; and
    the second passageway formed in the detachable cover, and the circumscribing sidewall carrying the slit valve are located in spaced apart relation relative to the peripheral edge of the outwardly facing portion of the valve control element, and the second passageway and the slit valve are accessible for cleaning without disassembling the valve control element from the valve housing.

* * * * *